(12) United States Patent
Lipchin et al.

(10) Patent No.: US 12,307,717 B2
(45) Date of Patent: May 20, 2025

(54) AUTOMATIC CAMERA CALIBRATION

(71) Applicant: MOTOROLA SOLUTIONS, INC., Chicago, IL (US)

(72) Inventors: Aleksey Lipchin, Newton, MA (US); Chia Ying Lee, Medford, MA (US); Keshav T. Seshadri, Medford, MA (US); Sergey Veselkov, Ashland, MA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 146 days.

(21) Appl. No.: 18/322,217

(22) Filed: May 23, 2023

(65) Prior Publication Data
US 2024/0394919 A1  Nov. 28, 2024

(51) Int. Cl.
*G06T 7/70* (2017.01)
*G06T 7/80* (2017.01)

(52) U.S. Cl.
CPC ............... *G06T 7/80* (2017.01); *G06T 7/70* (2017.01); *G06T 2207/30196* (2013.01); *G06T 2207/30244* (2013.01)

(58) Field of Classification Search
CPC ... G06T 7/80; G06T 7/70; G06T 2207/30196; G06T 2207/30244
See application file for complete search history.

(56) References Cited

U.S. PATENT DOCUMENTS

| 11,321,872 | B2 * | 5/2022 | Lipchin | H04N 17/002 |
|---|---|---|---|---|
| 2007/0127774 | A1 * | 6/2007 | Zhang | G08B 13/19602 382/103 |
| 2021/0118180 | A1 * | 4/2021 | Zamora Esquivel | G06T 7/74 |
| 2022/0028114 | A1 | 1/2022 | Lee et al. | |
| 2023/0136084 | A1 * | 5/2023 | Perrault | G06T 7/97 348/187 |

OTHER PUBLICATIONS

Krahnstoever, et al., "Bayesian Autocalibration for Surveillance," General Electric Global Research, IEEE Computer Society, 2005 (8 pages).

\* cited by examiner

*Primary Examiner* — John W Miller
*Assistant Examiner* — Humam M Satti
(74) *Attorney, Agent, or Firm* — Michael Best & Friedrich LLP (57) ABSTRACT

Systems and method for camera calibration. In one example, the camera includes an electronic processor configured to obtain a bounding box in a captured image, the bounding box bounding a person in the image and having a lowermost vertical coordinate and an uppermost vertical coordinate. The electronic processor determines an initial estimation of values of a set of camera parameters Θ and a current estimation of values of the set of camera parameters Θ based on the initial estimation. The electronic processor iteratively updates the current estimation of values of the set of camera parameters Θ by determining feet coordinates within the bounding box, determining a vertical head coordinate, and updating the current estimation of values of the set of camera parameters Θ by reducing a difference between the vertical head coordinate and the uppermost vertical coordinate of the bounding box.

18 Claims, 6 Drawing Sheets

AUTOMATIC CAMERA CALIBRATION

BACKGROUND

Automated security and monitoring systems typically rely on imaging devices, such as video cameras, with computer vision capabilities for performing object recognition. Camera calibration increases object detection accuracy by filtering out false positive object detection based on, for example, object size. Camera calibration also increases object tracking accuracy by enabling the tracking of objects using physical coordinates in the environment surrounding the camera rather than coordinates of an image captured by the camera. Camera calibration additionally supports other video analytics features that use estimation of object location and sizes in the physical world.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments, examples, aspects, and features.

The apparatus and method components have been represented where appropriate by conventional symbols in the drawings, showing only those specific details that are pertinent to understanding the embodiments, examples, aspects, and features described and illustrated so as not to obscure the disclosure with details that will be readily apparent to those of ordinary skill in the art having the benefit of the description herein.

DETAILED DESCRIPTION

An inertial measurement unit (IMU) is an electronic device that measures the specific force, angular rate, and orientation of an object or device, such as a camera. IMUs typically include a combination of accelerometers, gyroscopes, and sometimes magnetometers. Conventional automatic camera calibration techniques often require that the camera be equipped with IMUs in order to measure camera parameters such as height, focal length, tilt, and roll. While deep learning methods for estimating camera calibration without IMUs exist, these deep learning methods are often unreliable and scene-specific.

Therefore, there is a need for automatic camera calibration that can be implemented in both cameras equipped with IMUs and cameras without IMUs while providing accurate calibration. To address, among other things, these problems, systems and methods are provided herein for automatic camera calibration. Among other things, examples described herein provide a camera including an electronic processor configured to: obtain an image captured using the camera, the image including a person; obtain a bounding box in the image, the bounding box bounding the person and having a lowermost vertical coordinate $y_{bottom}$ and an uppermost vertical coordinate $y_{top}$; determine an initial estimation of values of a set of camera parameters $\Theta$; and determine a current estimation of values of the set of camera parameters $\Theta$ based on the initial estimation. The electronic processor iteratively updates the current estimation of values of the set of camera parameters $\Theta$ by: determining feet coordinates $(x_f, y_f)$ within the bounding box, the feet coordinates $(x_f, y_f)$ associated with a location of feet of the person, wherein the feet coordinates $(x_f, y_f)$ are determined based on the current estimation of the values of the set of camera parameters $\Theta$; determining a vertical head coordinate $y_h$ associated with an estimated vertical location of a head of the person, wherein the vertical head coordinate $y_h$ is determined based on the current estimation of the values of the set of camera parameters $\Theta$ and the feet coordinates $(x_f, y_f)$; and updating the current estimation of values of the set of camera parameters $\Theta$ by reducing a difference between the vertical head coordinate $y_h$ and the uppermost vertical coordinate $y_{top}$ of the bounding box.

In some aspects, the set of camera parameters $\Theta$ includes camera height H, focal length f, tilt $\theta$, and roll $\rho$.

In some aspects, the electronic processor is configured to determine the feet coordinates (xf, yf) by placing a human triangle model over the bounding box, the human triangle model having a first vertex l corresponding to a left foot of the person, a second vertex r corresponding to a right foot of the person, and a third vertex v corresponding to the head, wherein the feet coordinates (xf, yf) correspond to a midpoint m between the first vertex l and the second vertex r.

In some aspects, the electronic processor is configured to model a 3D orientation of the human by placing the human triangle model over the bounding box such that, in a 3D environment surrounding the human, the midpoint m, the first vertex l, and the second vertex r are on a line perpendicular to a direction that the camera is pointing and parallel to a horizon line.

In some aspects, the human triangle model corresponds to one of a plurality of model configurations, and the electronic processor determines the feet coordinates (xf, yf) based on the corresponding one of the plurality of model configurations.

In some aspects, the head coordinates and the feet coordinates $(x_f, y_f)$ model the person using a feet-to-head homology defined as follows:

$$\begin{bmatrix} x_h \\ (y_f + h) \\ w \end{bmatrix} = \begin{bmatrix} 1 - \dfrac{H_0}{H}\sin^2(\rho)\sin^2(\theta) & \dfrac{H_0}{H}\sin(\rho)\cos(\rho)\sin^2(\theta) & -\dfrac{H_0}{H}f\sin(\rho)\sin(\theta)\cos(\theta) \\ \dfrac{H_0}{H}\sin(\rho)\cos(\rho)\sin^2(\theta) & 1 - \dfrac{H_0}{H}\cos^2(\rho)\sin^2(\theta) & \dfrac{H_0}{H}f\cos(\rho)\sin(\theta)\cos(\theta) \\ -\dfrac{H_0}{H}f\sin(\rho)\sin(\theta)\cos(\theta) & \dfrac{H_0}{H}\cos(\rho)\sin(\theta)\cos(\theta) & 1 - \dfrac{H_0}{H}\cos^2(\theta) \end{bmatrix} \begin{bmatrix} x_f \\ y_f \\ 1 \end{bmatrix}.$$

where $x_h$ is a horizontal head coordinate of the person in the bounding box, $H_0$ is a predetermined value associated with an average human height, $x_h$ is a location of the head on the image, $h=y_h-y_f$, and w is an unknown homogenous coordinate.

In some aspects, using the feet-to-head homology, the electronic processor is configured to determine h as a quadratic rational function of the feet coordinates (x, y), where the quadratic rational function is defined as follows:

$$h(H, f, \theta, \rho) = \frac{Ay^2 + Dx_f y_f + Ex_f + By_f + C}{1 + Fx_f - Ay_f},$$

and where coefficients A, B, C, D, E, F, and G are functions of camera height H, focal length f, tilt θ, and roll ρ.

In some aspects, the electronic processor is configured to update the current estimation of the values of the set of camera parameters Θ by minimizing a loss function over H, f, θ, ρ.

In some aspects, the loss function is defined as follows: $L(H, f, \theta, \rho) = \Sigma_{bounding\ boxes}(h_b(f, \theta, \rho) - h(H, f, \theta, \rho))^2$, where $h_b = y_{top} - y_f$.

In some aspects, the electronic processor is configured to determine an initial estimation of values of a set of camera parameters Θ by: assuming that the camera is oriented parallel to a horizon line.

In some aspects, the electronic processor is configured to determine an initial estimation of values of the set of camera parameters Θ by: reducing the quadratic rational function to:

$$h(H, f, \theta) = \frac{Ay_f^2 + By_f + C}{1 - Ay_f};$$

performing a Taylor expansion on the quadratic rational function such that the quadratic rational function further reduces to: $h(H, f, \Theta) = (Ay_f^2 + By_f + C)(1 + Ay_f + A^2 y_f^2) = ay_f^2 + by_f + c$, where $$A = \frac{a}{1+b}, B = b - \frac{ca}{1+b},$$

and C=c; estimating that $y_f = y_{bottom}$ such that $h_b = y_{top} - y_{bottom}$; and estimating of the values of the set of camera parameters Θ by minimizing, over H, f, θ, ρ, the loss function.

In some aspects, the electronic processor is configured to determine an initial estimation of values of the set of camera parameters Θ by: reducing the quadratic rational function to:

$$h(H, f, \theta) = \frac{Ay_f^2 + By_f + C}{1 - Ay_f};$$

and estimating that a value of $Ay_f$ is negligible compared to a value of 1 such that the quadratic rational function further reduces to: $h(H, f, \theta) = Ay_f^2 + By_f + C$.

In some aspects, the electronic processor is configured to obtain a first plurality of images captured using the camera, each image including a person and a bounding box bounding the person, and determine the initial estimation of values of the set of camera parameters Θ using the first plurality of images.

In some aspects, the electronic processor is configured to obtain a second plurality of images captured using the camera, each image including a person and a bounding box bounding the person, and for each of the second plurality of images, iteratively update the current estimation of values of the set of camera parameters Θ.

In some aspects, the first plurality of images and the second plurality of images are the same.

Another example provides a method for calibrating a camera. The method includes: obtaining an image captured using the camera, the image including a person; obtaining a bounding box in the image, the bounding box bounding the person and having a lowermost vertical coordinate $y_{bottom}$ and an uppermost vertical coordinate $y_{top}$; determining an initial estimation of values of a set of camera parameters Θ; and determining a current estimation of values of the set of camera parameters Θ based on the initial estimation. The method also includes iteratively updating the current estimation of values of the set of camera parameters Θ by: determining feet coordinates ($x_f$, $y_f$) within the bounding box, the feet coordinates ($x_f$, $y_f$) associated with a location of feet of the person, wherein the feet coordinates ($x_f$, $y_f$) are determined based on the current estimation of the values of the set of camera parameters ⊖; determining a vertical head coordinate $y_h$ associated with an estimated vertical location of a head of the person, wherein the vertical head coordinate $y_h$ is determined based on the current estimation of the values of the set of camera parameters Θ and the feet coordinates ($x_f$, $y_f$); and updating the current estimation of values of the set of camera parameters Θ by reducing a difference between the vertical head coordinate $y_h$ and the uppermost vertical coordinate $y_{top}$ of the bounding box.

In some aspects, the set of camera parameters Θ includes camera height H, focal length f, tilt θ, and roll ρ.

In some aspects, determining the feet coordinates ($x_f$, $y_f$) includes placing a human triangle model over the bounding box, the human triangle model having a first vertex l corresponding to a left foot of the person, a second vertex r corresponding to a right foot of the person, and a third vertex v corresponding to the head, wherein the feet coordinates ($x_f$, $y_f$) correspond to a midpoint m between the first vertex l and the second vertex r.

In some aspects, the method further includes modeling a 3D orientation of the human by placing the human triangle model over the bounding box such that, in a 3D environment surrounding the human, the midpoint m is on a line perpendicular to a direction that the camera is pointing and parallel to a horizon line.

In some aspects, the human triangle model corresponds to one of a plurality of model configurations, and the method comprises determining the feet coordinates $(x_f, y_f)$ based on the corresponding one of the plurality of model configurations.

For ease of description, some or all of the example systems presented herein are illustrated with a single exemplar of each of its component parts. Some examples may not describe or illustrate all components of the systems. Other examples may include more or fewer of each of the illustrated components, may combine some components, or may include additional or alternative components.

Figure 1:
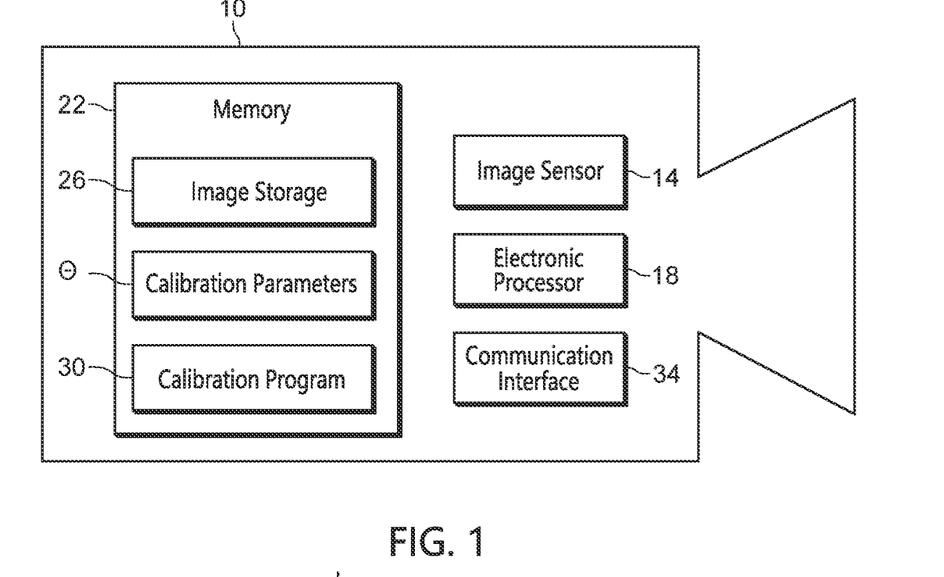
FIG. 1 illustrates an imaging device, according to some aspects.

FIG. 1 schematically illustrates an imaging device 10, according to some examples. The imaging device 10 is, for example, a camera including an image sensor 14 for capturing a plurality of images (e.g., a plurality of images included in a video). The imaging device 10 may be a digital imaging device or an analog imaging device. The image sensor 14 may be operable to capture light within the visible light frequency range and/or outside of the visible light frequency range (e.g., infrared or ultraviolet light). In some instances, the image sensor 14 includes multiple image sensors 14 operable to capture light in different frequency ranges. In some instances, the imaging device 10 is a stereo camera including at least two image sensors 14.

The imaging device 10 also includes an electronic processor 18 (for example, a microprocessor or other electronic device). The electronic processor 18 is electrically coupled to the image sensor 14, a memory 22, and a communication interface 34. The electronic processor 18 includes suitable processing circuitry for performing the methods described herein or any combination of suitable processing circuitry. For example, the electronic processor 18 may include a digital signal processor (DSP), a graphics processing unit (GPU) embedded processor, a vision processing unit, etc. One or more circuit units included in the electronic processor 18 may operate independently or in parallel with one another.

In the example shown, the memory 22 stores data and computer program instructions for performing, among other things, the methods described herein. For example, the memory 22 includes image storage 26 for storing images captured by the image sensor 14, a set of camera parameters Θ associated with a calibration of the imaging device 10, and a calibration program 30 executable by the electronic processor 18 for estimating and adjusting the values of the set of camera parameters Θ. The memory 22 may include read only memory (ROM), random access memory (RAM), other non-transitory computer-readable media, or a combination thereof.

The imaging device 10 is operable to send and receive data, such as a video stream, video analytics data, parameter information, and/or commands to one or more external devices using the communication interface 34. In some instances, the camera calibration program 30 is stored external to the imaging device 10, and the set of camera parameters Θ are transmitted to the memory 22 via the communication interface 34. The imaging device 10 may include additional components other than those described with respect to FIG. 1. The imaging device 10 may alternatively be referred to herein as the camera 10.

Figure 2:
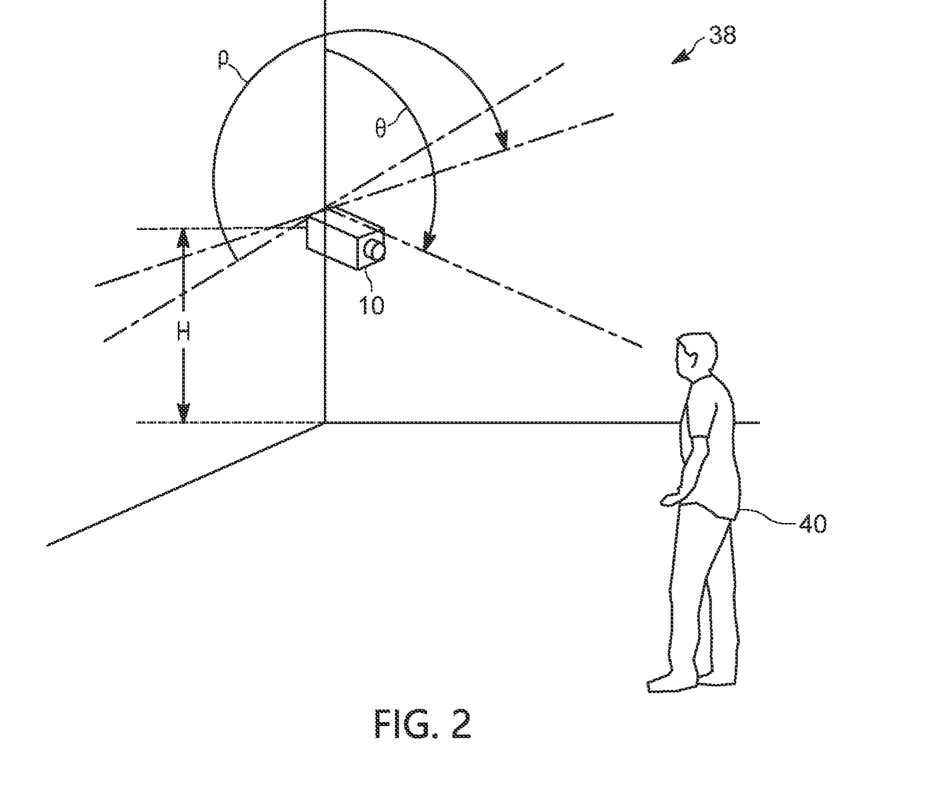
FIG. 2 illustrates an imaging device arranged to record a scene, according to some aspects.

Referring now to FIG. 2, the camera 10 is configured to obtain a plurality of images of a scene 38. The plurality of images is, for example, a plurality of images obtained by the camera using the image sensor 14 as part of a video recording. An image captured of the scene 38 may include one or more objects, such as, for example, a human 40.

Using, for example, known computer vision techniques, the camera 10 is operable to detect the presence of the human 40 in an obtained image.

How the camera 10 is oriented when recording the scene 38 defines, at least in part, the set of camera parameters Θ. For example, the set of camera parameters Θ include a camera height H, a focal length f, a camera tilt θ, and a camera roll ρ, such that the set of camera parameters Θ= (H, f, θ, ρ). However, in some instances, the set of camera parameters Θ include more or fewer parameters than those described herein. Some or all of the parameters included in the set of camera parameters Θ may be unknown.

Figure 3:
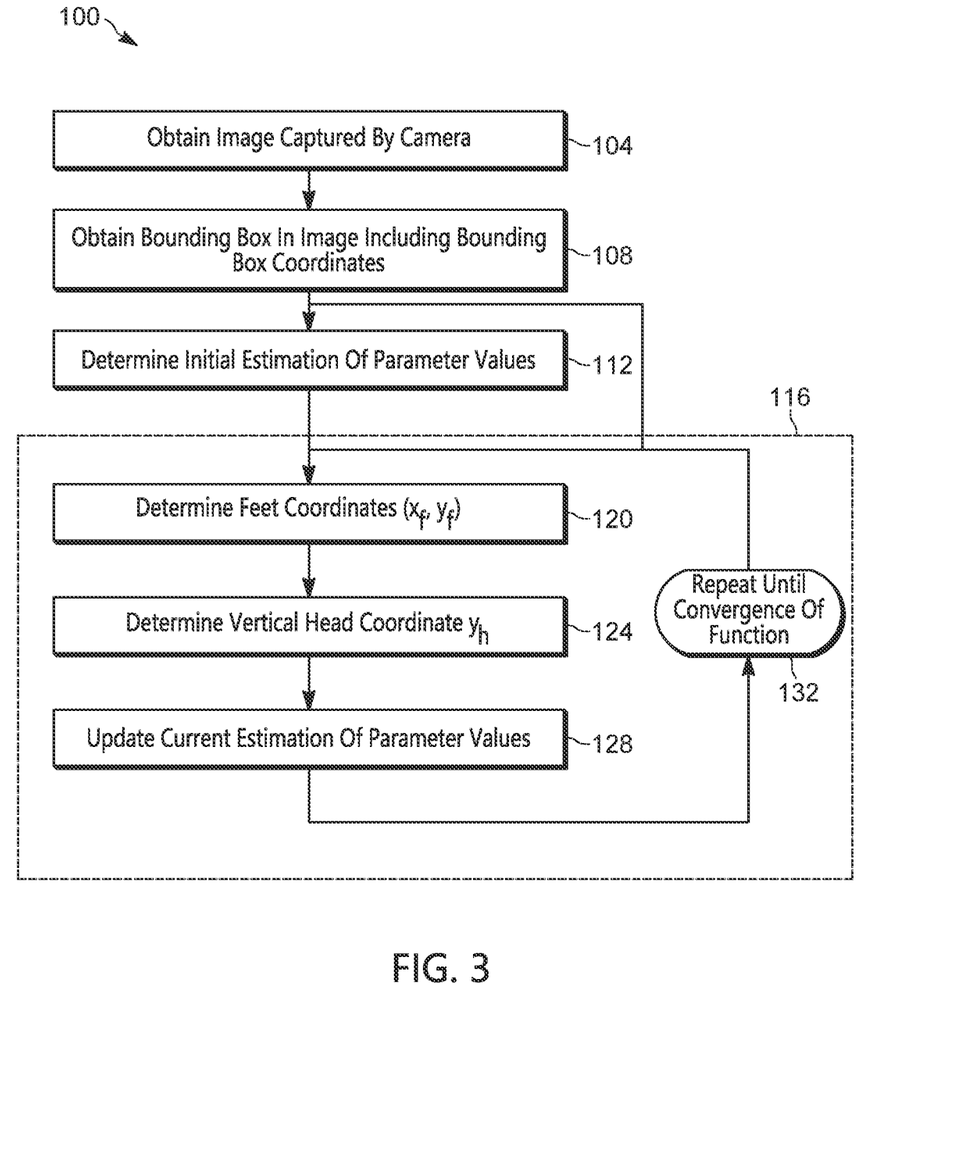
FIG. 3 illustrates a method for calibrating an imaging device, according to some aspects.

FIG. 3 illustrates a method 100, performed by the electronic processor 18, for determining the values of the set of camera parameters Θ. The method 100 includes obtaining an image captured by the camera 10 of a scene, such as the scene 38 (at block 104). The image includes at least one person, such as the human 40.

While the method 100 is described herein with respect to only one image, it should be understood that the steps for the method 100 may be performed using a plurality of images (e.g., a plurality of images in a video recording). For example, each step of the method 100 may be performed with respect to each of a plurality of images.

Figure 4:
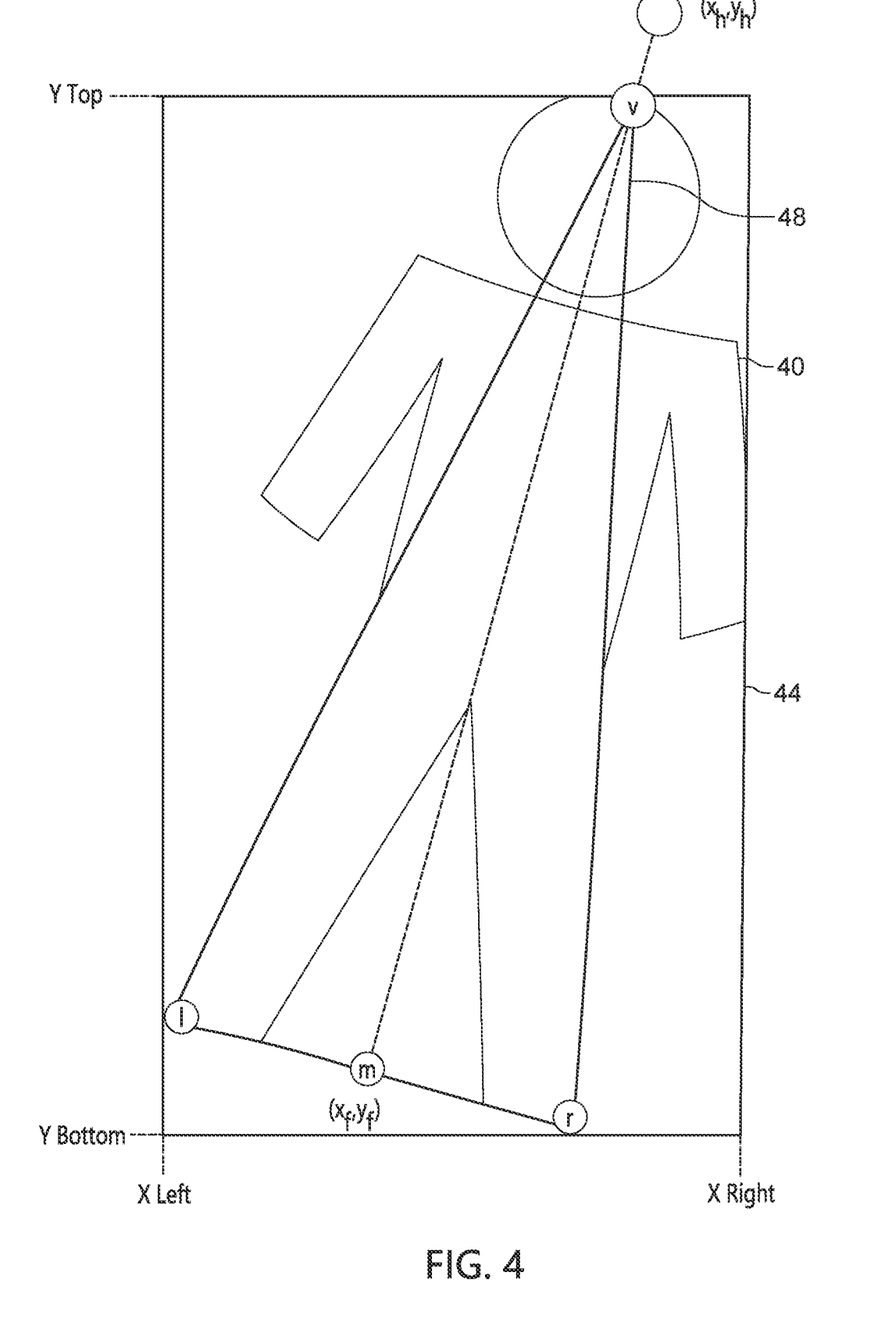
FIG. 4 illustrates a bounding box and an object within the bounding box, according to some aspects.

The method 100 includes detecting, or obtaining a bounding box, such as bounding box 44 illustrated in FIG. 4, in the image to the image (at block 108). As described above with reference to FIG. 2, bounding box 44 bounds a detected object, such as the person 40. The electronic processor 18 generates the bounding box using, for example, a machine learning module. The bounding box 44 includes a set of bounding box coordinates defining the perimeter of the bounding box 44 with respect to the captured image in a 2D plane. Referring to FIG. 4, for example, the coordinates of the bounding box 44 at least include a lowermost vertical coordinate $y_{bottom}$, an uppermost vertical coordinate $y_{top}$, a leftmost horizontal coordinate $x_{left}$, and a rightmost horizontal coordinate $x_{right}$. While only one bounding box 44 is described herein, the number of bounding boxes 44 included in a captured image is not limited to one. For example, the electronic processor 18 may obtain a bounding box in the captured image for each person detected in the image.

Referring again to FIG. 3, the method 100 includes determining, using the bounding box coordinates, an initial estimation of the values of the set of camera parameters Θ (at block 112). The process of determining the initial estimation of the values of the set of camera parameters Θ will be described in greater detail below with respect to FIG. 7. In some instances, one or more values of the set of camera parameters Θ are known, the electronic processor 18 may only determine an initial estimation for the unknown parameters. For example, if the camera height H is known, the electronic processor 18 determines an initial estimation of the values of the other camera parameters (f, θ, ρ). However, when all the camera parameters Θ are unknown, the electronic processor 18 determines the initial estimation of the values of all of the camera parameters Θ. Determining an initial estimation, or assumption, of the camera parameters Θ enables the electronic processor 18 to complete the calibration process more quickly.

In the example provided, after the electronic processor 18 has determined the initial estimation of the camera parameters Θ, the method 100 proceeds to a loop 116 in which the electronic processor 18 iteratively updates a current estimation of the values of the set of camera parameters Θ. The electronic processor 18 performs the steps of the loop 116 for each of a plurality of images (e.g., frames of a video), and, therefore, a plurality of bounding boxes 44 respectively included in the images. For example, upon initiating the loop 116, the electronic processor 18 determines the current estimation of the set of camera parameters Θ based on the initial estimation of the values of the set of camera parameters Θ, such that the current estimation of the set of camera parameters Θ is equal to the initial estimation of the set of camera parameters Θ. At each iteration of the loop 116, the electronic processor 18 updates the values of the current estimation of the set of camera parameters Θ.

The loop 116 includes determining, with respect to the 2D plane of the captured image, feet coordinates ($x_f$, $y_f$) within the bounding box 44 (at block 120). The feet coordinates ($x_f$, $y_f$) are associated with a location of the feet of the person 40, and are determined based, at least in part, on the bounding box coordinates. The electronic processor 18 determines the feet coordinates ($x_f$, $y_f$) by generating and placing, over the bounding box 44, a human triangle model, such as, for example, the human triangle model 48 illustrated in FIGS. 4 and 5.

Figure 5:
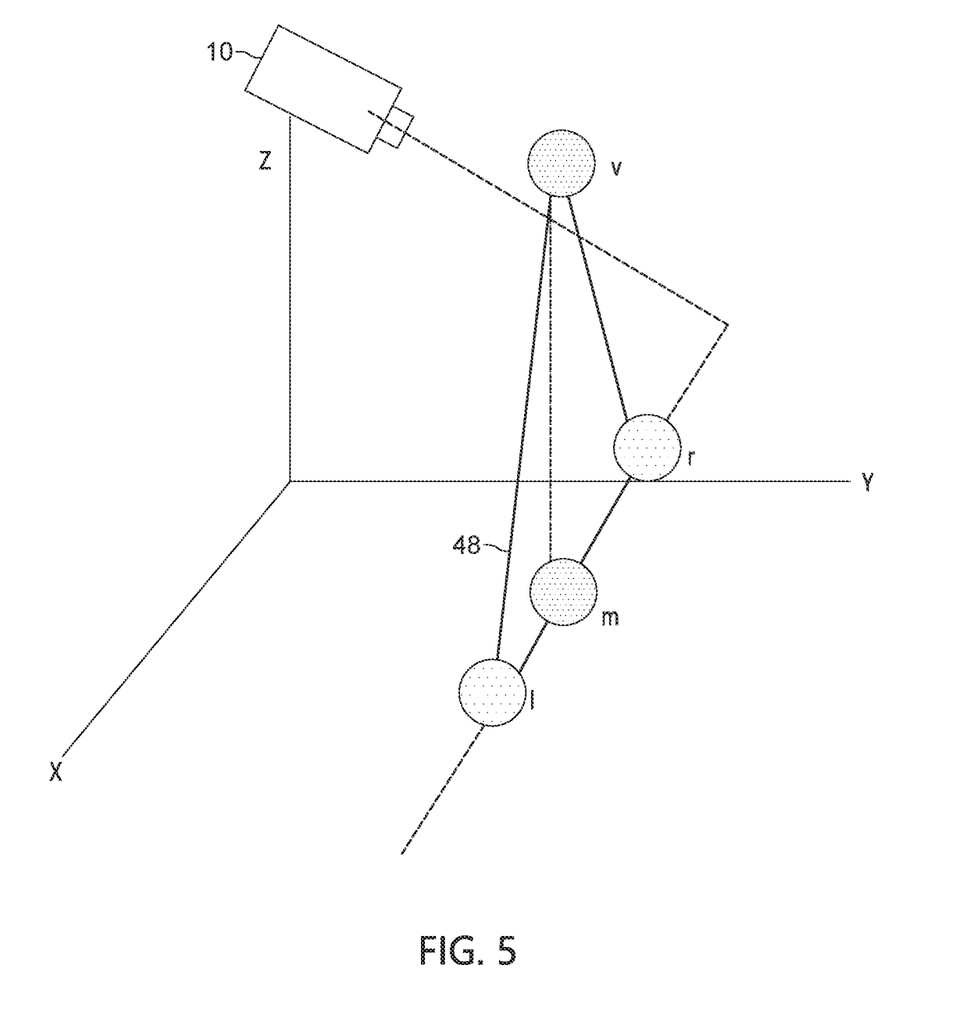
FIG. 5 illustrates a projection of a model in a 3D environment, according to some aspects.

In the example shown, the human triangle model 48 includes 2D geometry that models the orientation of the human 40 in the 3D world. The human triangle model 48 includes a first vertex/corresponding to a location of a left foot of the person 40, a second vertex r corresponding to an estimated location of a right foot of the person 40, and a third vertex v corresponding to a location of the head of the person 40. The electronic processor 18 then determines a midpoint m between the first vertex I and the second vertex r. As illustrated in FIG. 5, a line connecting the first vertex/and the second vertex r of the human triangle model 48 is perpendicular to a line extending along the direction that the camera is pointed, and parallel to the horizon (e.g., the x-axis line of FIG. 5) in the 3D environment.

Figure 6:
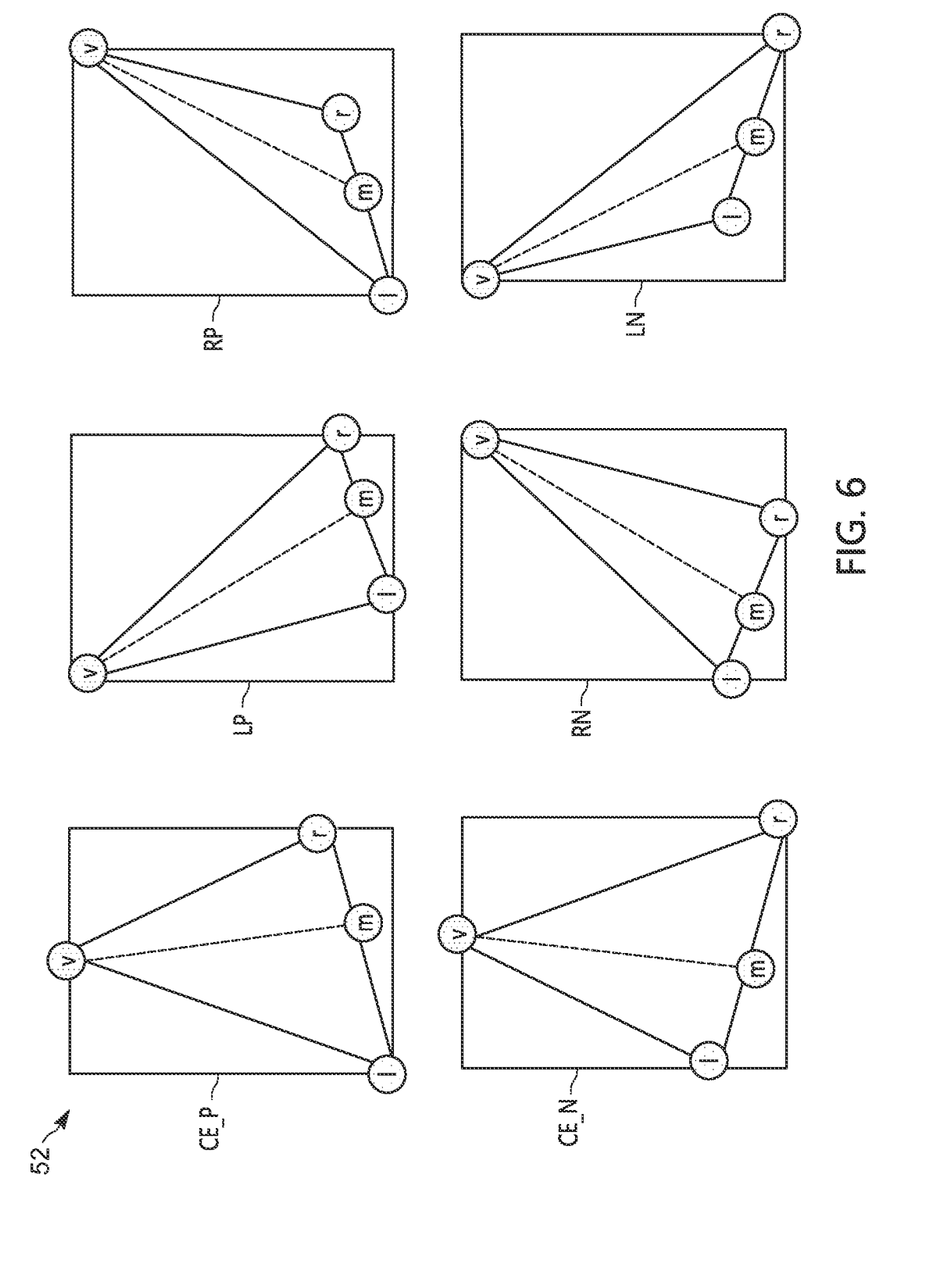
FIG. 6 illustrates a set of possible model orientations, according to some aspects.

Referring now to FIG. 6, the electronic processor 18, selects the human triangle model 48 from plurality of candidate human triangle models 52 based on the orientation of the person 40 in the 3D environment. The electronic processor 18 projects the estimated locations of the feet (e.g., vertices l and r) and the head (e.g., vertex v) to the 2D plane of the image, and compares the vertices (l, r, v) to the bounds of the bounding box 44. Based on the comparison, the electronic processor 18 determines which of the plurality of candidate human triangle models 52 corresponds to the orientation of the person 40. One example of determining the correspondence is explained in more detail in the paragraphs that follow.

In one example, the plurality of candidate human triangle models 52 include, for example, a center positive model CE_P, a center negative model CE_N, a right negative model RN, a left positive model LP, right positive model RP, and a left negative model LN. The electronic processor 18 determines that the orientation of the human 40 corresponds to one of the positive models (e.g., CE_P, RP, and LP) when the horizon line (e.g., the line connecting the first vertex l and the second vertex r) has a value of $\rho \geq \pi$ radians (e.g., the horizon line rotates counter clockwise from the line y=0 in the 3D environment illustrated in, for example, FIG. 5).

Regarding the negative models, the electronic processor 18 determines that the orientation of the person 40 corresponds to one of the negative models (e.g., CE_N, RN, and LN) when the horizon line has a value of $\rho < \pi$ radians (e.g., the horizon line rotates clockwise from the line y=0 in the 3D environment illustrated in, for example, FIG. 5).

The electronic processor 18 determines that the orientation of the person 40 corresponds to a center model (e.g., CE_P or CE_N), a left model (e.g., LP or LN), or a right model (e.g., RP or RN) by calculating the x coordinate of the intersection of a first line extending between the top left bounding box coordinates ($x_{left}$, $y_{top}$) and the top right bounding box coordinates ($x_{right}$, $y_{top}$) and a second line extending from the midpoint m to the vertical vanishing point (e.g., the point where all vertical lines in real world coordinates, upon projection onto the image plane, intersect).

When the potential head location v is located left of the leftmost horizontal coordinate $x_{left}$ of the bounding box 44, the electronic processor 18 determines that the orientation of the human 40 corresponds to a left model (e.g., LP or LN). When the potential head location v is located right of the rightmost horizontal coordinate $x_{right}$ of the bounding box 44, the electronic processor 18 determines that the orientation of the human 40 in the bounding box 44 corresponds to a right model (e.g., RP or RN). When the potential head location v is bounded between the leftmost horizontal coordinate $x_{left}$ and the rightmost horizontal coordinate $x_{right}$, the electronic processor 18 determines that the orientation of the human 40 in the bounding box 44 corresponds to a center model (e.g., CE_P or CE_N).

Referring again to FIG. 4, after determining the corresponding one of the plurality of candidate human triangle models 52, the electronic processor 18 uses the determined human triangle model 48, placed over the bounding box 44, to calculate the feet coordinates ($x_f$, $y_f$) with respect to the 2D plane of the image. The feet coordinates ($x_f$, $y_f$) correspond to a location of the midpoint m on the 2D plane of the image. Therefore, the electronic processor 18 determines the feet coordinates ($x_f$, $y_f$) by calculating respective coordinates of the left vertex l and the right vertex r with respect to the 2D plane of the image. The electronic processor 18 calculates respective coordinates of the left vertex l and the right vertex r differently based on the corresponding one of the plurality of candidate human triangle models 52.

Referring again to FIG. 3, in one example, the method 100 includes determining head coordinates ($x_h$, $y_h$) associated with an estimated location of the head of the person 40 in the image (at block 124). The electronic processor 18 estimates the human height h using the feet coordinates ($x_f$, $y_f$) and the current estimation of the camera parameters Θ. By estimating the human height h, the electronic processor 18 implicitly estimates the head vertical coordinate $y_h$ based on the estimated human height h and the feet coordinates ($x_f$, $y_f$) such that $y_h = y_f + h$.

The feet coordinates ($x_f$, $y_f$) and the head coordinates ($x_h$, $y_h$) model the person 40 using a feet-to-head homology:

$$\begin{bmatrix} x_h \\ (y_f + h) \\ w \end{bmatrix} = \begin{bmatrix} 1 - \frac{H_0}{H}\sin^2(\rho)\sin^2(\theta) & \frac{H_0}{H}\sin(\rho)\cos(\rho)\sin^2(\theta) & -\frac{H_0}{H}f\sin(\rho)\sin(\theta)\cos(\theta) \\ \frac{H_0}{H}\sin(\rho)\cos(\rho)\sin^2(\theta) & 1 - \frac{H_0}{H}\cos^2(\rho)\sin^2(\theta) & \frac{H_0}{H}f\cos(\rho)\sin(\theta)\cos(\theta) \\ -\frac{H_0}{H}f\sin(\rho)\sin(\theta)\cos(\theta) & \frac{H_0}{H}\cos(\rho)\sin(\theta)\cos(\theta) & 1 - \frac{H_0}{H}\cos^2(\theta) \end{bmatrix} \begin{bmatrix} x_f \\ y_f \\ 1 \end{bmatrix},$$

where w is an unknown homogenous coordinate and $H_0$ is a predetermined value associated with an average human height. $H_0$ is, for example, 1.75 meters ("m"). However, in some instances, the value of $H_0$ is a value different from 1.75 m (e.g., 1.8 m, 1.72 m, 1.68 m, etc.).

Using the feet-to-head homology, the electronic processor 18 determines the human height h as a quadratic rational function of the feet coordinates $(x_f, y_f)$. The quadratic rational function is defined as:

$$h(H, f, \theta, \rho) = \frac{Ay_f^2 + Dx_f y_f + Ex_f + By_f + C}{1 + Fx_f - Ay_f},$$

where coefficients A, B, C, D, and E are functions of the camera height H, focal length f, tilt θ, and roll ρ, such that, for example, $$A = -\frac{\cos(\rho)\sin(\theta)\cos(\theta)}{sf}, B = \frac{\cos^2(\theta) - \cos^2(\rho)\sin^2(\theta)}{s},$$

$$C = \frac{f\cos(\rho)\sin(\theta)\cos(\theta)}{s},$$

$$D = \frac{\sin(\rho)\sin(\theta)\cos(\theta)}{sf}, E = \frac{\sin(\rho)\cos(\rho)\sin^2(\theta)}{s},$$

$$F = -\frac{\sin(\rho)\sin(\theta)\cos(\theta)}{sf}, \text{ where } s = \frac{H_0}{H} - \cos^2(\theta).$$

Referring briefly to FIG. 4, for example, because the head coordinates $(x_h, y_h)$ are estimated using the current estimation of the camera parameters Θ, the location of the head coordinates $(x_h, y_h)$ with respect to the image may not necessarily correspond to the location of the head of the person 40 in the image.

To account for this potential deficiency, some implementations of the method 100 also includes updating the current estimation of the values of the camera parameters Θ by reducing a difference between the estimated human height h and the human height in the bounding box $h_b$, where $h_b = y_{top} - y_f$. In particular, the electronic processor 18 reduces a difference between the vertical head coordinate $y_h$ and the uppermost vertical coordinate $y_{top}$ of the bounding box 44.

L(H, f, θ, ρ)=$\Sigma_{bounding\ boxes}(h_b(f, \theta, \rho) - h(H, f, \theta, \rho))^2$ At block 128, the electronic processor 18 updates the estimation of the values of the set of parameters Θ by reducing, or in some examples, minimizing, a loss function over H, f, θ, ρ. The loss function may be defined as:

L(H, f, θ, ρ)=$\Sigma_{bounding\ boxes}(h_b(f, \theta, \rho) - h(H, f, \theta, \rho))^2$. However, other definitions of the loss function are contemplated such that a difference between $y_h$ and $y_{top}$ (e.g., a difference between $h_b$ and h) is reduced or minimized.

The values of h and hc may differ for a variety of reasons, such as, for example, because the values of the set of camera parameters Θ may not be accurate (for example, while the camera calibration process is incomplete), because the human triangle model 48 does not precisely model the shape of the person 40, because of noise in the bounding box detection, or because the height of the person 40 is not the same as the value of $H_0$. Therefore, by minimizing the loss function, the estimation of the values of the set of camera parameters Θ becomes more accurate as the loop 116 iterates. The loop 116 may iterate until convergence of the loss function (at block 132).

Figure 7:
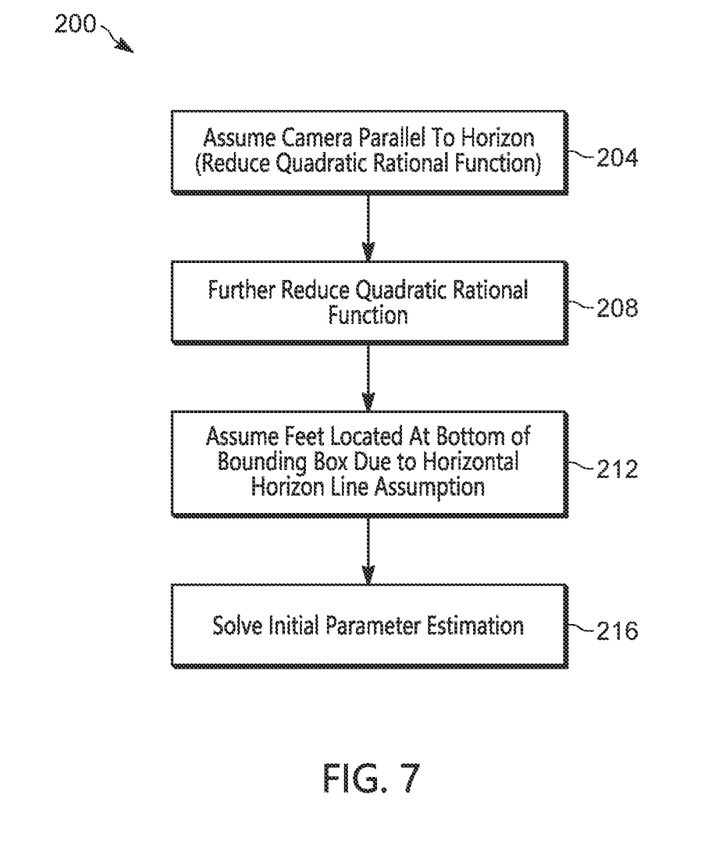
FIG. 7 illustrates a method for initial camera calibration, according to some aspects.

Referring now to FIG. 7, a method 200, implemented by, for example, the electronic processor 18, for determining the initial estimation of the values of the set of camera parameters Θ is illustrated. The steps of the method 200 may be performed for a plurality of images, such as, for example, for a predetermined number of video frames, for a predetermined period of time, or until the electronic processor 18 otherwise determines that the computation of the initial estimation of the set of camera parameters Θ is complete.

In some instances, the method 200 includes assuming, that the orientation of the camera 10 is parallel to the horizon in the 3D environment (at block 204). For example, the electronic processor 18 initially assumes, that roll ρ=π radians such that, when used in the feet-to-head-homology equation, the corresponding quadratic rational function associated with the feet-to-head-homology equation reduces to:

$$h(H, f, \theta) = \frac{A'y_f^2 B' y_f + C'}{1 - A'y_f}, \text{ where } A' = \frac{\sin(\theta)\cos(\theta)}{sf},$$

$$B' = \frac{\cos^2(\theta) - \sin^2(\theta)}{s}, \text{ and } C' = -\frac{f\sin(\theta)\cos(\theta)}{s}.$$

The method 200 includes further reducing the reduced quadratic function (at block 208). In some examples, the electronic processor 18 performs a Taylor expansion on the reduced quadratic function and drops the high order terms such that the reduced quadratic rational function further reduces to a quadratic function defined as:

$$h(H, f, \theta) = (Ay_f^2 + By_f + C)(1 + Ay_f + A^2 y_f^2) = ay_f^2 + by_f + c,$$

$$\text{where } A = \frac{a}{1+b}, B = b - \frac{ca}{1+b}, \text{ and } C = c.$$

However, other examples of further reducing the quadratic function to a quadratic function are contemplated. For example, the electronic processor 18 may alternatively estimate that, in the reduced quadratic rational function, the value of $Ay_f$ is negligible compared to a value of 1 such that the quadratic rational function further reduces to: h(H, f, θ)=$Ay_f^2 + By_f + C$.

The method 200 includes estimating that, in the image, the feet of the person 40 (and therefore the midpoint m) are located at the bottom of the bounding box 44 such that $y_f = y_{bottom}$, and therefore that $h_b = y_{top} - y_{bottom}$ (at block 212). The electronic processor 18 applies $h_b = y_{top} - y_{bottom}$ and the further reduced quadratic rational function to the loss function such that the loss function reduces to: L(H, f, θ)=$\Sigma_{bounding\ boxes}\{y_{top} - y_{bottom} - h(H, f, \theta)\}^2$.

The electronic processor 18 then determines the initial estimation of the set of camera parameters Θ by, for example, solving a least squares estimation of the reduced loss function (at block 216). The least squares estimation may be defined as: $\min_\Theta \Sigma_i^n r_i^2(\Theta)$, where n is the number of data points (e.g., the batch size) and $r_i(\Theta)$ is the residual such that $r_i(\Theta) = h_b(f, \theta, \rho) - h(H, \theta, \rho)$.

In some instances, the electronic processor 18 solves the estimation using a Gauss-Newton method to approximate high order derivatives with Jacobian matrix J and a pseudo-inverse matrix A such that:

$$\Theta = \Theta - (J^T J)^{-1} J^T r, \text{ where } J_{ij} = \frac{\partial ri(\Theta)}{\partial \Theta j},$$

$$A^{(n)} = \left(J^{(n)T} J^{(n)}\right)^{-1}, \text{ and } b^{(n)} = J^{(n)T} r^{(n)}.$$

Because the Jacobian matrix J is large, the electronic processor 18 may implement a recursive method to compute the Jacobian matrix J (for example, such that it is not computed in its entirety at once). At each recursive step (e.g., after n−1 data points), the electronic processor 18 computes $A^{(n)}$ and $b^{(n)}$ with respect to $A^{(n-1)}$ and $b^{(n-1)}$, respectively, such that:

$$A^{(n)} = A^{(n-1)} - A^{(n-1)} d^{(n)} \left(1 + d^{(n)T} A^{(n-1)} d^{(n)}\right)^{-1} d^{(n)T} A^{(n-1)} \text{ and } b^{(n)} =$$

$$b^{(n-1)} + d^{(n)} r_n^{(n)}, \text{ where } d_j^{(n)} = J_{nj}^{(n)} = \frac{\partial r_n^{(n)}}{\partial \Theta j}, \text{ and } j = 1, \dots, m.$$

The electronic processor 18 then updates the camera parameters Θ with the Gauss-Newton approximation such that: $\Theta^{(n+1)} = \Theta^n - A^{(n)} b^{(n)}$.

While the initial estimation is described as being performed using a Gauss-Newton method to solve the loss function, other methods of solving the loss function are contemplated. For example, in some instances, the electronic processor 18 updates the camera parameters Θ by optimizing the parameters Θ for the loss function using stochastic gradient descent.

In the foregoing specification, specific examples have been described. However, one of ordinary skill in the art appreciates that various modifications and changes can be made without departing from the scope of the claimed subject matter. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an example can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

Additionally, unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

It should also be understood that although certain drawings illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations, for example, collectively. To reiterate, those electronic processors and processing may be distributed.

What is claimed is:

1. A camera comprising:
   an electronic processor configured to:
   obtain an image captured using the camera, the image including a person;
   obtain a bounding box in the image, the bounding box bounding the person and having a lowermost vertical coordinate $y_{bottom}$ and an uppermost vertical coordinate $y_{top}$;
   determine an initial estimation of values of a set of camera parameters $\Theta$;
   determine a current estimation of values of the set of camera parameters $\Theta$ based on the initial estimation; and
   iteratively update the current estimation of values of the set of camera parameters $\Theta$ by:
   determining feet coordinates $(x_f, y_f)$ within the bounding box, the feet coordinates $(x_f, y_f)$ associated with a location of feet of the person, wherein the feet coordinates $(x_f, y_f)$ are determined based on the current estimation of the values of the set of camera parameters $\Theta$ by
   placing a human triangle model over the bounding box, the human triangle model having a first vertex l corresponding to a left foot of the person, a second vertex r corresponding to a right foot of the person, and a third vertex v corresponding to a head of the person, wherein the feet coordinates $(x_f, y_f)$ correspond to a midpoint m between the first vertex l and the second vertex r;
   determining a vertical head coordinate $y_h$ associated with an estimated vertical location of the head of the person, wherein the vertical head coordinate $y_h$ is determined based on the current estimation of the values of the set of camera parameters $\Theta$ and the feet coordinates $(x_f, y_f)$; and
   updating the current estimation of values of the set of camera parameters $\Theta$ by reducing a difference between the vertical head coordinate $y_h$ and the uppermost vertical coordinate $y_{top}$ of the bounding box.

2. The camera of claim 1, wherein the set of camera parameters $\Theta$ includes camera height H, focal length f, tilt $\theta$, and roll $\rho$.

3. The camera of claim 1, wherein the electronic processor is configured to model a 3D orientation of the human by placing the human triangle model over the bounding box such that, in a 3D environment surrounding the human, the midpoint m, the first vertex l, and the second vertex r are on a line perpendicular to a direction that the camera is pointing and parallel to a horizon line.

4. The camera of claim 1, wherein the human triangle model corresponds to one of a plurality of model configurations, and
   the electronic processor determines the feet coordinates $(x_f, y_f)$ based on the corresponding one of the plurality of model configurations.

5. The camera of claim 2, wherein the head coordinates and the feet coordinates $(x_f, y_f)$ model the person using a feet-to-head homology defined as follows:

$$\begin{bmatrix} x_h \\ (y_f + h) \\ w \end{bmatrix} = \begin{bmatrix} 1 - \frac{H_0}{H}\sin^2(\rho)\sin^2(\theta) & \frac{H_0}{H}\sin(\rho)\cos(\rho)\sin^2(\theta) & -\frac{H_0}{H}f\sin(\rho)\sin(\theta)\cos(\theta) \\ \frac{H_0}{H}\sin(\rho)\cos(\rho)\sin^2(\theta) & 1 - \frac{H_0}{H}\cos^2(\rho)\sin^2(\theta) & \frac{H_0}{H}f\cos(\rho)\sin(\theta)\cos(\theta) \\ -\frac{H_0}{H}f\sin(\rho)\sin(\theta)\cos(\theta) & \frac{H_0}{H}\cos(\rho)\sin(\theta)\cos(\theta) & 1 - \frac{H_0}{H}\cos^2(\theta) \end{bmatrix} \begin{bmatrix} x_f \\ y_f \\ 1 \end{bmatrix},$$

where $x_h$ is a horizontal head coordinate of the person in the bounding box, $H_0$ is a predetermined value associated with an average human height, $x_h$ is a location of the head on the image, $h = y_h - y_f$, and w is an unknown homogenous coordinate.

6. The camera of claim 5, wherein, using the feet-to-head homology, the electronic processor is configured to determine h as a quadratic rational function of the feet coordinates (x, y), where the quadratic rational function is defined as follows:

$$h(H, f, \theta, \rho) = \frac{Ay^2 + Dx_f y_f + Ex_f + By_f + C}{1 + Fx_f - Ay_f},$$

and where coefficients A, B, C, D, E, F, and G are functions of camera height H, focal length f, tilt $\theta$, and roll $\rho$.

7. The camera of claim 6, wherein the electronic processor is configured to update the current estimation of the values of the set of camera parameters $\Theta$ by minimizing a loss function over H, f, $\theta$, $\rho$.

8. The camera of claim 7, wherein the loss function is defined as follows:

$$L(H, f, \theta, \rho) = \sum_{bounding\,boxes} (h_b(f, \theta, \rho) - h(H, f, \theta, \rho))^2,$$

where $h_b = y_{top} - y_f$.

9. The camera of claim 8, wherein the electronic processor is configured to determine an initial estimation of values of a set of camera parameters Θ by:
assuming that the camera is oriented parallel to a horizon line.

10. The camera of claim 8, wherein the electronic processor is configured to determine an initial estimation of values of the set of camera parameters Θ by:
reducing the quadratic rational function to:

$$h(H, f, \theta) = \frac{Ay_f^2 + By_f + C}{1 - Ay_f};$$

performing a Taylor expansion on the quadratic rational function such that the quadratic rational function further reduces to:

$$h(H, f, \theta) = (Ay_f^2 + By_f + C)(1 + Ay_f + A^2 y_f^2) = ay_f^2 + by_f + c,$$

where $A = \frac{a}{1+b}$, $B = b - \frac{ca}{1+b}$, and $C = c;$ estimating that $y_f = y_{bottom}$ such that $h_b = y_{top} - y_{bottom}$; and estimating of the values of the set of camera parameters Θ by minimizing, over H, f, θ, ρ, the loss function.

11. The camera of claim 8, wherein the electronic processor is configured to determine an initial estimation of values of the set of camera parameters Θ by:
reducing the quadratic rational function to:

$$h(H, f, \theta) = \frac{Ay_f^2 + By_f + C}{1 - Ay_f};$$

and
estimating that a value of $Ay_f$ is negligible compared to a value of 1 such that the quadratic rational function further reduces to: $h(H, f, \theta) = Ay_f^2 + By_f + C$.

12. The camera of claim 2, wherein the electronic processor is configured to
obtain a first plurality of images captured using the camera, each image including a person and a bounding box bounding the person, and
determine the initial estimation of values of the set of camera parameters Θ using the first plurality of images.

13. The camera of claim 12, wherein the electronic processor is configured to
obtain a second plurality of images captured using the camera, each image including a person and a bounding box bounding the person, and for each of the second plurality of images, iteratively update the current estimation of values of the set of camera parameters Θ.

14. The camera of claim 13, wherein the first plurality of images and the second plurality of images are the same.

15. A method for calibrating a camera, the method comprising:
obtaining an image captured using the camera, the image including a person;
obtaining a bounding box in the image, the bounding box bounding the person and having a lowermost vertical coordinate $y_{bottom}$ and an uppermost vertical coordinate $y_{top}$;
determining an initial estimation of values of a set of camera parameters Θ;
determining a current estimation of values of the set of camera parameters Θ based on the initial estimation; and
iteratively updating the current estimation of values of the set of camera parameters Θ by:
determining feet coordinates $(x_f, y_f)$ within the bounding box, the feet coordinates $(x_f, y_f)$ associated with a location of feet of the person, wherein the feet coordinates $(x_f, y_f)$ are determined based on the current estimation of the values of the set of camera parameters Θ by
placing a human triangle model over the bounding box, the human triangle model having a first vertex l corresponding to a left foot of the person, a second vertex r corresponding to a right foot of the person, and a third vertex y corresponding to a head of the person, wherein the feet coordinates $(x_f, y_f)$ correspond to a midpoint m between the first vertex l and the second vertex r;
determining a vertical head coordinate $y_h$ associated with an estimated vertical location of the head of the person, wherein the vertical head coordinate $y_h$ is determined based on the current estimation of the values of the set of camera parameters Θ and the feet coordinates $(x_f, y_f)$; and
updating the current estimation of values of the set of camera parameters Θ by reducing a difference between the vertical head coordinate $y_h$ and the uppermost vertical coordinate $y_{top}$ of the bounding box.

16. The method of claim 15, wherein the set of camera parameters Θ includes camera height H, focal length f, tilt θ, and roll ρ.

17. The method of claim 15, further comprising modeling a 3D orientation of the human by placing the human triangle model over the bounding box such that, in a 3D environment surrounding the human, the midpoint m, the first vertex l, and the second vertex r are on a line perpendicular to a direction that the camera is pointing and parallel to a horizon line.

18. The method of claim 15, wherein the human triangle model corresponds to one of a plurality of model configurations, and
the method comprises determining the feet coordinates $(x_f, y_f)$ based on the corresponding one of the plurality of model configurations.

* * * * *